Sept. 30, 1952 W. O. VEDDER 2,612,236
DUST COLLECTOR
Filed Jan. 6, 1950 3 Sheets—Sheet 1
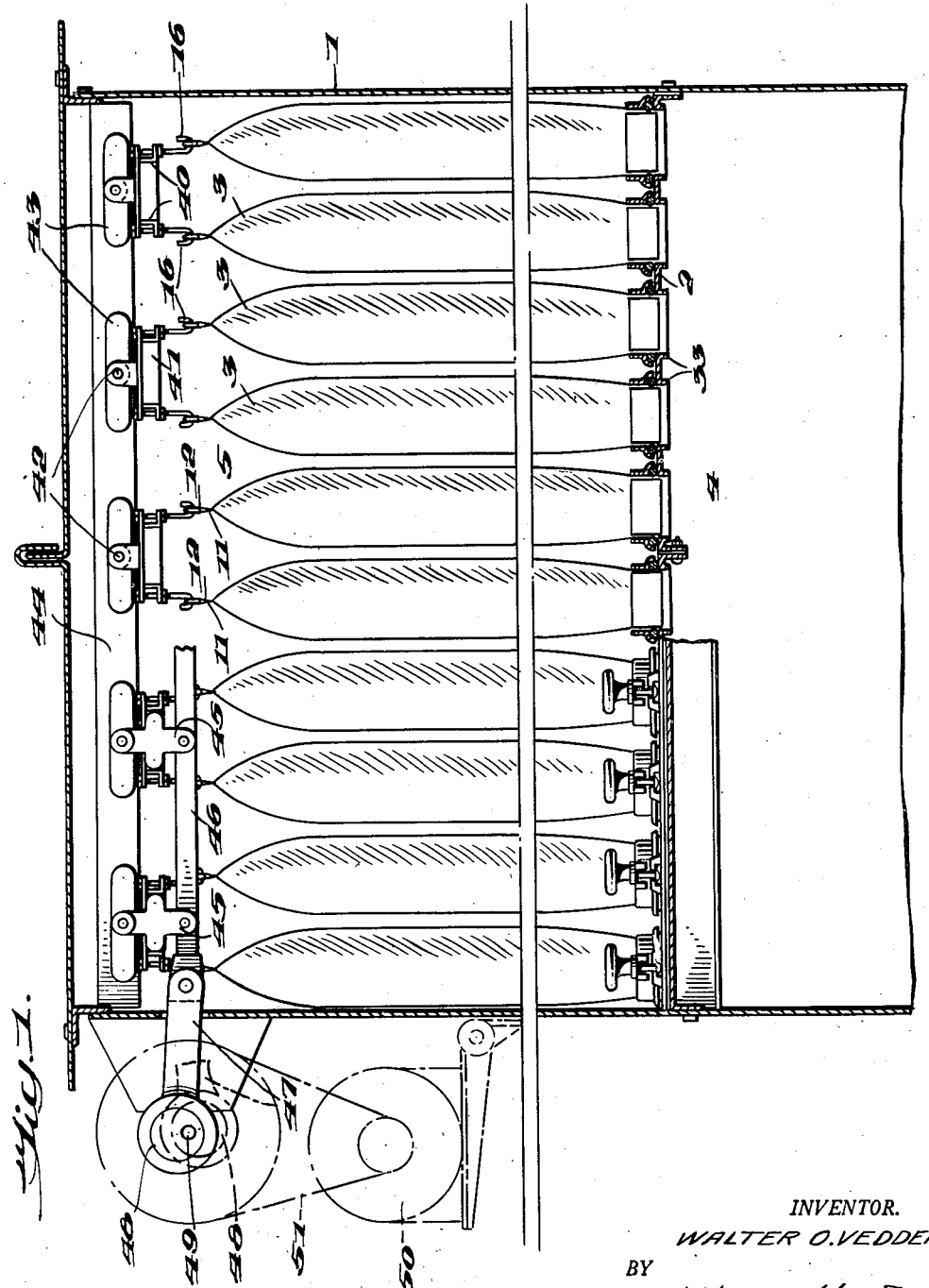
INVENTOR.
WALTER O. VEDDER,
BY
Hall + Houghton
ATTORNEYS

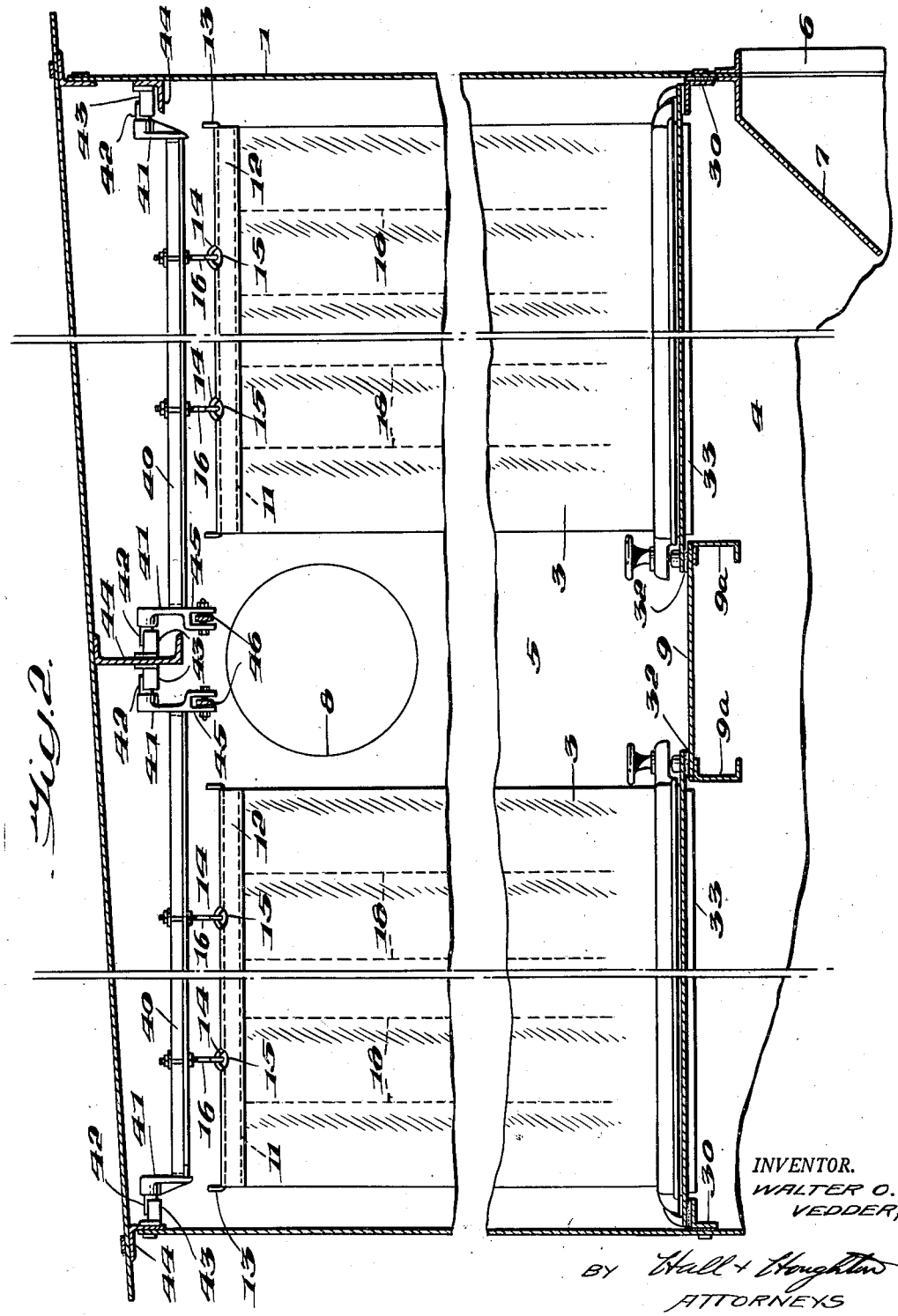

Sept. 30, 1952  W. O. VEDDER  2,612,236
DUST COLLECTOR
Filed Jan. 6, 1950 3 Sheets-Sheet 3
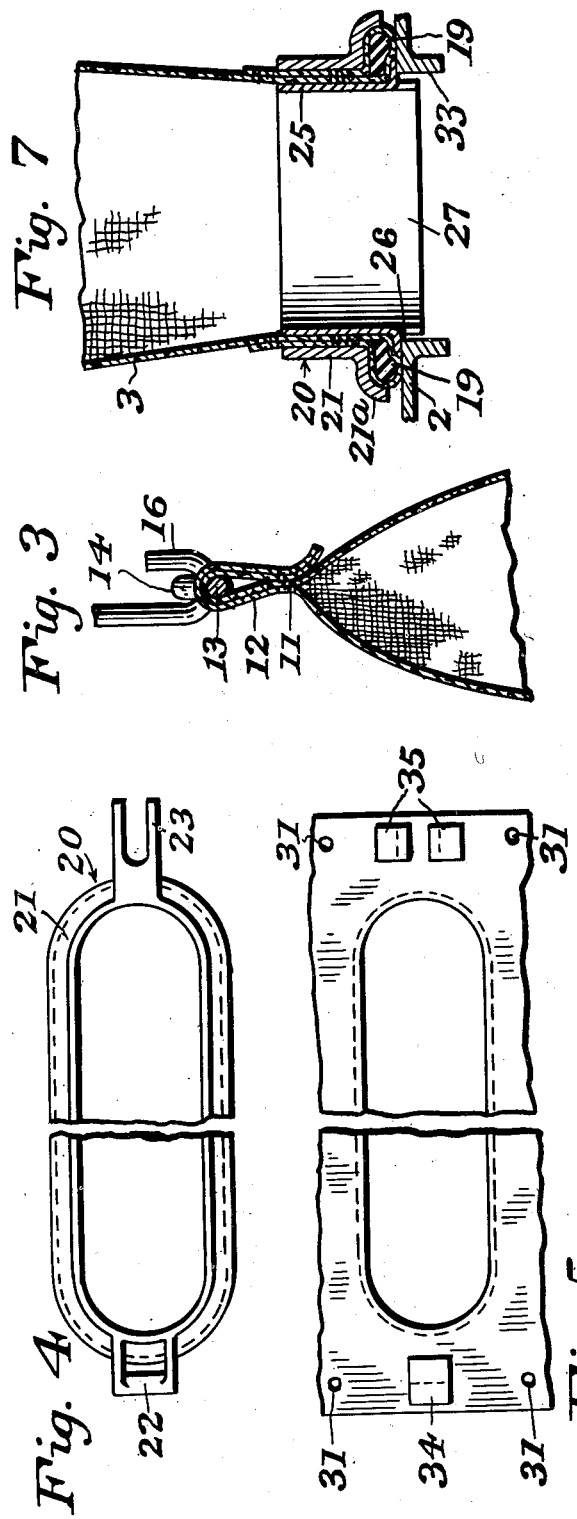
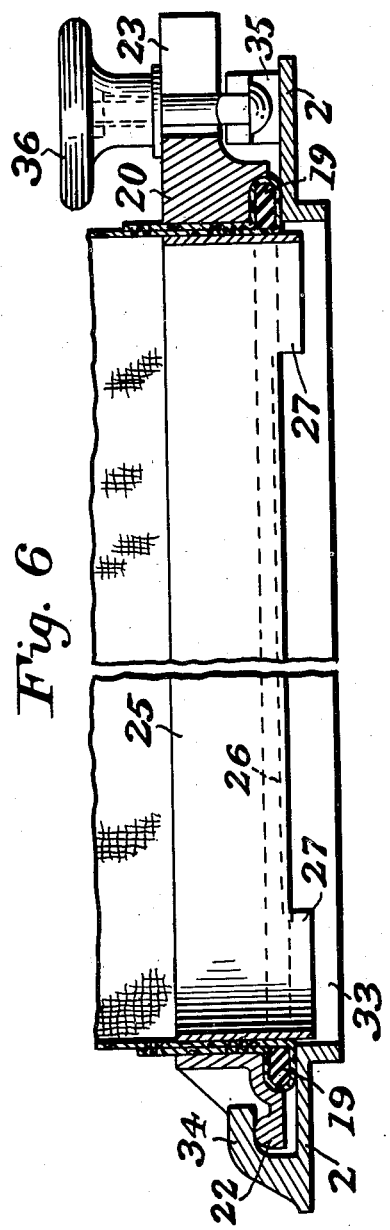
INVENTOR
WALTER O. VEDDER
ATTORNEY Patented Sept. 30, 1952

2,612,236

UNITED STATES PATENT OFFICE 2,612,236

DUST COLLECTOR

Walter O. Vedder, Hagerstown, Md., assignor to Pangborn Corporation, Hagerstown, Md., a corporation of Maryland Application January 6, 1950, Serial No. 137,220

8 Claims. (Cl. 183—58)

This invention relates to dust collectors and aims generally to improve the same. More particularly, it relates to collectors of the cloth bag type, and has for its principal objects, severally and interdependently, the provision of improved features and arrangements contributing to the production of a simple, economical and easily serviced collector, more especially as regards the means for supporting the filter elements, the means for securing the same to the grid plate in a simple, effective and quickly changeable manner, and the means for shaking the filter elements to remove accumulated dust therefrom. These and further objects and advantages of the invention will be apparent from the following description of an exemplary embodiment thereof. The invention resides in the new and useful features of construction and arrangements of parts hereinafter described and pointed out in the appended claims.

In the accompanying more or less diagrammatic drawings of the illustrative embodiment Figs. 1 and 2 are longitudinal and transverse sections through the filtering portion of a collector embodying the invention.

Fig. 3 is an enlarged detail of one of the top supports for the filter bags.

Fig. 4 is a plan view of one of the bag bottom securing nozzles.

Fig. 5 is a plan view of a portion of a grid plate formed to cooperate therewith.

Figs. 6 and 7 are transverse and longitudinal sections respectively through one of the bag, nozzle, retainer and grid plate assemblies.

General arrangement

In the dust collector art it is conventional to provide a collector housing 1, divided by some sort of grid plate 2 and filter elements 3 into a dust separating chamber 4 and a clean air chamber 5. Dust laden air is conventionally supplied to the dust separating or expansion chamber 4 through an inlet 6 (Fig. 2) and is usually deflected in the chamber 4 by some sort of baffle arangement, exemplified at 7 (Fig. 2), so that heavier entrained particles will be separated out before the air and finer dust particles pass upwardly into the cloth bag filters 3. The lower part of the chamber 4 usually comprises a dust hopper (not shown), and means for removing the separated dust therefrom (not shown). The flow of air through the separator is usually effected by an exhaust fan (not shown) connected with the clean air chamber 5, as by an outlet opening 8. A central walkway 9 is also conventionally provided to facilitate inspections and replacement of the filter units.

Bag filters

In accordance with the present invention the filter bags 3 are preferably of relatively great transverse width as shown in Fig. 2, as compared to their longitudinal width, shown in Fig. 1. As best shown in Figs. 2 and 3, the tops of the bags are preferably hemmed, as along the line 11, to form an open bight 12 through which is run a wire or rod 13 provided with spaced hanger loops 14 projecting through openings 15 formed in the hem, to engage hanger hooks 16, hereinafter described. As shown in Fig. 2, the respective ends of the wires or rods 13 may be upturned, in the same plane as the loops 14, to assist in retaining the bags in proper position thereon.

As is also shown in Fig. 2, each of the relatively flat bags 3 is also preferably provided, throughout the major part of its height, excepting its lower, nozzle entering mouth portion, with spaced parallel rows of stitching 18 which prevent undue ballooning of the bags and maintain them in shape as indicated in Figs. 1 and 2.

The lower end or mouth of each bag, which is not stitched along the lines 18, is provided with a cording 19, preferably of rubber or like resilient and compressible material, as best shown in Figs. 6 and 7. This rubber cording 19 may be secured to the bag mouth in any desired manner, as by hemming the material about it, molding it thereon, or otherwise. The continuous resiliently corded edge thereby provided cooperates in a novel manner with the grid plate 2, nozzle 20 and retainer 25 as will now be described.

Filter to grid plate assembly

The nozzle 20, as best illustrated in Figs. 4, 6 and 7, in the form shown comprises a vertically and laterally flanged angle frame 21, sized to embrace the lower end of the filter bag 3 just above the rubber-corded edge thereof. In inside dimensions, this nozzle, like the bag mouth, is relatively wide in the transverse direction of the housing and relatively narrow in the longitudinal direction thereof. While the size of the bags and nozzle openings may be varied, a representative size may be taken as about 4 inches by 36 inches which gives the transverse cross section an aspect ratio of 9:1, and the ends of the elongated opening through the nozzle are preferably curved, or semi-circular, as shown in Fig. 4. The outwardly extending lateral flange of the nozzle 20 is preferably downturned or undercut as shown at 21a, Figs. 6 and 7, to provide in the under side of this flange a downwardly facing cord-receiving groove or shoulder marginal to the bag mouth receiving opening. Suitable means are provided for securing the nozzle to the grid-plate, preferably by providing the nozzle at one of its ends with a tongue element 22, shown as carried by integral side webs unitary with the nozzle proper, and at the opposite end with a bifurcated clamp element 23, also shown as cast or forged integral with the nozzle proper.

The retainer 25, above mentioned, in its preferred form comprises means for holding the bag mouth in engagement with the inner walls of the nozzle, means for holding the corded edge of the bag mouth in proper relation to the nozzle flange 21a, and means for centering the bag mouth, nozzle and retainer assembly in proper alignment with the grid-plate opening hereinafter described.

In the preferred embodiment illustrated the retainer 25 comprises a sleeve of sheet metal or other appropriate material, shaped to fit snugly within the bag mouth when the same is in place in the nozzle 20, and having out-turned flange means 26 to extend under the rubber cording and hold it in place under the laterally extending flange of the nozzle, and to overly the grid plate 2 and prevent downward displacement of the retainer 25.

As is best shown in Figs. 6 and 7, the out-turned flange 26 is preferably struck up along the greater part of the length of the longer sides of the elongated cross section of the retainer, and extends only part way under the rubber-corded edge 19. This construction is advantageous as it imparts stiffness to the retainer throughout its longer dimension, assures a snug fit between the sides of the retainer, the bag mouth, and the nozzle, and assures a tight seal.

The centering means of the retainer, in the form shown, comprise downwardly projecting flange elements 27, herein formed about the arcuate ends of the retainer member 25, and constituting the portions of the metal thereof not struck-up to form the retaining and stiffening flange 26. These downwardly projecting flange elements 27, in the assembly of the collector, extend into the cooperating opening in the grid plate 2, which will now be more fully described.

As is shown in Figs. 1 and 2, the grid-plate or grid plates 2 extend throughout the length of the separator at either side of the walkway 9. They are supported at their inner edges on the walkway 9, of the walkway supporting channels 9a, and at their outer edges on angle iron supports 30, extending the longitudinal walls of the housing 1, and preferably constituting part of the housing framing. The grid plate is preferably formed in sections of unit length, two sections being shown in Fig. 1, so that the capacity of the collector may be suited to the work load by adding units thereto with unit increases in longitudinal length of the housing. The grid sections are suitably secured to the supports, as by riveting or bolting through the bolt holes 31, Fig. 5, and packing strips 32, as shown in Fig. 2, are preferably interposed in the joints to seal the grid plate partitions and force all the air being cleaned to pass through the filter units. Each of the sections of grid plate 2 as best shown in Figs. 1, 5 and 6, is provided with a plurality of parallel, transversely extending openings through it corresponding in size and shape to the openings through the nozzle members 20, and each of these grid plate openings is preferably provided with a downwardly extending flange 33, preferably marginal of the opening, serving to stiffen the plate against flexure.

Hold down means, for cooperating with the nozzle securing means, is also supplied at each opening in the plate 2, which, as best shown in Figs. 5 and 6 preferably comprises a keeper or lug 34 formed integral with the plate 2 at the outer end of the opening therethrough, and under which the tongue 22 of the nozzle 20 is secured, and a bifurcated keeper or lug 35, also formed integral with the plate 2, at the inner or walkway abutting portion thereof, in position to underly the bifurcated clamp element 23 carried by the nozzle 20.

By virtue of this construction, it will be apparent that the mouths of bags 3 may very quickly and effectively be secured to the grid plate openings and detached therefrom, by an operator positioned on the walkway 9. All he has to do to secure a bag section is to insert its mouth through the nozzle member 20, insert the retainer within the mouth and nozzle from below, push the tongue 22 of the nozzle under the lug 34, tilt the nozzle down into the position shown in Fig. 6, and secure the bifurcated clamp element 23 to the bifurcated lug 35 in any suitable way, for example, by engaging with the bifurcated clamp and lug a clamp screw assembly 36, shown as comprising a hand nut, washer, and bolt, the latter being flat sided adjacent its head to slide into the relatively narrow bifurcation of the lug 35 to hold it from rotating during tightening of the hand nut 36. During this assembly, the side webs of the tongue 22 and the depending flange means 27 of the retainer 25 insure proper centering of the nozzle, lug and retainer assembly in the opening through the grid plate, and proper compression of the rubber corded edge 19 between the grid plate and the nozzle, quickly and easily effecting an airtight seal. To remove a bag it is merely necessary to loosen the clamp screw 36, lift the nozzle assembly from the grid plate, remove the retainer, and pull the bag mouth out of the nozzle.

*Top supporting and shaking arrangement*

As above mentioned, the hemmed upper edges 12 of the bag 3, with their hanger wires 13—14, are supported on hooks 16, which in the form shown are adjustably bolted to shaker frames pivotally mounted in the upper part of the clean air chamber 5. In the preferred arrangement, shown in Figs. 1 and 2, the bags are connected in pairs to the hooked bars 40 of the shaker frames, the paired bars 40 being carried by shaker end plates 41 provided intermediately with pivots or pintles 42 which rest in supports shown as half journals 43 carried by longitudinal structural members 44 of the housing 1. Means for rocking the shaker frames about their pivots 42 are also provided, preferably at the inner ends of the frames 40 in overlying relation to the walkway 9. As shown, each frame 40 is provided with a rocker arm 45, attached to or formed integral with an end plate 41 and depending therefrom, the depending rocker arms 45 being pivoted to rocker links 46 extending above the walkway 9. The rocker links 46, in turn are connected to connecting rods 47, journalled on eccentrics 48 carried by crank shaft 49, which is suitably driven as by motor 50 and belt or chain drive 51.

As shown, the motor and eccentrics are preferably mounted on the end of the housing 1, and a plurality of eccentrics are preferably employed to drive the rockers' links 46 out of phase with each other, thus reducing vibration during the shaking operation.

Operation

With the construction herein disclosed the housing and grid plates having been assembled, it is a very simple matter to assemble the shaker elements therein, hang the bags thereon, and secure the bag mouths and nozzles to the grid plate.

After an interval of dust separation, when it is determined in any suitable way that the bags should be shaken, the flow of dust laden air into the separator (or a separately shakable unit thereof) is interrupted, and the shaker mechanism is put into operation. The dust shaken from the insides of the bags descends through the retainers into the underlying hopper.

When it is necessary to inspect or replace any bag, this is easily effected by an operator on the walkway, as above indicated. Since each bag section is a substantially flat unit when not inflated, it is easily inspected and the difficulties of determining which unit to replace (experienced when many individual small tubes are employed in rows extending longitudinally and transversely on each side of the walkway) are largely eliminated.

The cooperating relationship of the nozzle, retainer, and grid plate opening, assures full spreading of the corded bag mouth under the nozzle flange, and in a highly simple and effective manner, affords a certain seal, easily effected without at any time entering the dust receiving chamber 4.

From the foregoing description it will be apparent that the exemplary embodiment herein described is illustrative and not restrictive of the invention, the scope of which is defined in the appended claims.

I claim:

1. A bag type dust collector comprising a housing, a grid plate dividing the housing into a lower, dust receiving chamber and an upper bag and clean air receiving chamber, a walkway extending longitudinally of the grid plate, said grid plate being formed with transversely elongated openings at each side of said walkway, shaker frames positioned in said housing above and in spaced relation to said openings, filter bags suspended from said shaker frames, said bags having transversely elongated mouths provided with resilient marginal sealing means, transversely elongated nozzle members through which the mouths of said bags are extended, transversely elongated retainer sleeves receivable within said bag mouths and nozzles for positioning the sealing means of said bag mouths in underlying relation to the lower faces of said nozzles, said retainers being stiffened in their elongated dimension and having flange means for positioning the same relative to said grid plate openings, and said nozzles and grid plate being provided with clamping means for securing said nozzle, bag mouth and retainer assemblies in marginally sealed relation to the openings in said grid plate.

2. In a bag type dust collector, a grid plate having a series of parallel elongated openings therein, a series of nozzles having elongated openings therethrough each matching one of said grid openings, bags having elongated mouths formed to pass through and intimately fit against said nozzles, said bag mouths having resilient sealing means marginal of their mouth openings, separate retainer sleeves shaped to slide within said bag mouths and nozzles and to be directly attached only to said bag-and-nozzle combination to hold said bag mouths in place in the nozzles with the marginal sealing means outwardly of said sleeves, and securing elements on said plate and said nozzles for securing said nozzles to said grid-plate in alignment with said grid openings and compressing the marginal sealing means between the nozzle and plate to seal the bag mouths around their respective openings.

3. In a bag type dust collector, a grid plate having an elongated opening therein, a nozzle having an elongated opening therethrough matching said grid-plate opening, a filter bag having an elongated mouth formed to pass through and internally fit against said nozzle, said bag mouth having resilient sealing means marginal of its mouth opening, a separate retainer sleeve shaped to slide within said bag mouth and nozzle to be directly attached only to said bag-and-nozzle combination to hold said bag mouth in place in the nozzle with the marginal sealing means outwardly of said sleeve, said sleeve including outwardly extending flange portions below said sealing means and holding it against the nozzle, and securing elements on said plate and nozzle for securing said nozzle to said grid plate in alignment with the opening therein, said flange portions extending out far enough to abut against the upper surface of the plate, and the sealing means extending out beyond the flange portions so that it is directly compressed between the nozzle and plate by the securing elements and seals the bag mouth around the plate opening.

4. In a bag type dust collector, a grid plate having an elongated opening therein, a nozzle having an elongated opening therethrough matching said grid-plate opening, a filter bag having an elongated mouth formed to pass through and internally fit against said nozzle, said bag mouth having resilient sealing means marginal of its mouth opening, a separate retainer sleeve shaped to slide within said bag mouth and nozzle to be directly attached only to said bag-and-nozzle combination to hold said marginal sealing means outwardly of said sleeve, said sleeves comprising depending centering portions cooperating with said grid plate opening for aligning the nozzle therewith in the assembled relation thereof, and securing elements on said plate and nozzle for securing said nozzle to said grid-plate in alignment with the opening therein and compressing the marginal sealing means between the nozzle and plate to seal the bag mouth around the opening.

5. In a bag type dust collector, a grid plate having an elongated opening therein, a nozzle having an elongated opening therethrough matching said grid-plate opening, a filter bag having an elongated mouth formed to pass through and internally fit against said nozzle, said bag mouth having resilient sealing means marginal of its mouth opening, a retainer sleeve shaped to slide within said bag mouth and nozzle to hold said marginal sealing means outwardly of said sleeve and between said nozzle and said grid-plate marginally of the openings therethrough, and means for securing said nozzle to said grid plate in alignment with the opening therein, said last named means comprising a tongue element at one end of said elongated nozzle, a bifurcated lug at the other end thereof, a keeper on said grid plate near one end of its elongated opening and positioned to engage said tongue element during assembly of said nozzle in alignment with said grid plate opening, a bifurcated clamping element near the other end of said elongated grid plate opening, and hand screw means cooperable with said bifurcated elements to draw said nozzle, bag mouth and retainer assembly into sealing relation to said grid plate opening.

6. In an air filtering apparatus: a housing; a floor separating said housing into a dust collecting chamber and a clean air chamber; said floor having a central unobstructed walk-way extending in one direction across the housing; an inlet for dust laden air in the dust collecting chamber; an outlet for filtered air in the clean air chamber; a single row of tubular vertically suspended filter bags on each side of and extending parallel to the walk-way, each bag having a closed top, an open bottom and a relatively flat cross section with an aspect ratio of about 9 to 1, the long dimension being transverse to the walk-way; the floor on each side of the walk-way having elongated slots corresponding in size and shape to the cross section of said bag bottoms; securing elements sealing the lower ends of the bags about said openings and connecting the bags as filter elements between the dust-collecting chamber and the clean air chamber; and a shaking mechanism connected to shake the tops of the bags to dislodge dust particles filtered from the air by the bags; said bags having their relatively flat surfaces closely spaced to provide a compact construction having a large filter capacity, said securing elements for each bag comprising a resilient cording secured to and extending around the bag adjacent the open end, an anchoring ring having inside dimensions and an overall shape substantially the same as the flattened cross section of the bottom end of the filter bag, said anchoring ring fitting around the bottom portion of said bag and sealing the resilient cording to the floor; a retaining sleeve having outside dimensions substantially the same as the inside of the flattened cross section of said bags, said sleeve fitting snugly within the bottom portion of said bags and cooperating with the anchoring ring to hold said resilient cording in sealing position; outwardly extending tongue portions on one narrow end of said anchoring rings; first clamp members on the opposing narrow end of said anchoring rings; keeper lugs attached to the slotted floor adjacent the narrow slot ends furthest from the walk-way; and second clamp members attached adjacent the opposite slot ends accessible from the walk-way cooperating and releasably engaging with the first clamp members to fasten the anchoring rings and attached filter bags into sealed abutment with the floor upon the insertion of the tongue under the keeper lug and the positioning and the cooperative engagement of the clamp members.

7. In an air filtering apparatus: a housing; a floor separating said housing into a dust collecting chamber and a clean air chamber; said floor having a central unobstructed walk-way extending in one direction across the housing; an inlet for dust laden air in the dust collecting chamber; an outlet for filtered air in the clean air chamber; a single row of tubular vertically suspended filter bags on each side of and extending parallel to the walk-way, each bag having a closed top, an open bottom and a relatively flat cross section with an aspect ratio of about 9 to 1, the long dimension being transverse to the walk-way; the floor on each side of the walk-way having elongated slots corresponding in size and shape to the cross section of said bag bottoms; securing elements sealing the lower ends of the bags about said openings and connecting the bags as filter elements between the dust-collecting chamber and the clean air chamber; and a shaking mechanism connected to shake the tops of the bags to dislodge dust particles filtered from the air by the bags; said bags having their relatively flat surfaces closely spaced to provide a compact construction having a large filter capacity, said securing elements for each bag comprising a resilient cording secured to and extending around the bag adjacent the open end, a flanged anchoring ring having inside dimensions and an overall shape substantially the same as the flattened cross section of the bottom end of the filter bag, said anchoring ring fitting around the bottom portion of said bag adjacent to the resilient cording and being flanged outwardly and undercut to form a seat for said cording; outwardly extending tongue portions on one narrow end of said anchoring rings; first clamp members on the opposing narrow end of said anchoring rings; a retaining sleeve having substantially the same outside dimensions as the inside cross section of the filter bags and snugly fitted within the bottom portion of said bags and cooperating with the anchoring ring to hold said resilient cording expanded, part of said sleeve being flanged outwardly and positioned under said cord to retain it in said anchoring ring seat, and part of said sleeve projecting below the ring to position the open bag end against its floor slot; a keeper lug attached to the slotted floor adjacent the narrow slot ends furthest from the walk-way; and second clamp members attached adjacent the opposite slot ends, readily accessible from the walk-way, cooperating and releasably engaging with the respective first clamp members to draw the anchoring rings and attached filter bags into sealed abutment with the slotted floor upon the insertion of the tongues under the keeper lugs and the positioning and the cooperative engagement of the clamp members.

8. In a bag type dust collector, a grid plate having an elongated opening, a nozzle having an elongated opening therethrough matching said grid plate opening, a filter bag having an elongated mouth shaped to fit within the nozzle, said bag having resilient sealing means marginal of its mouth, a retainer sleeve independent of the plate shaped to fit within the bag mouth and nozzle and hold the resilient sealing means out below the nozzle, clamping elements on said nozzle and plate to clamp these two members together and compress the sealing means into sealing relation between them, and one of said members including an outer wall retaining said sealing means and confining it against the sleeve when the nozzle is clamped in place, to improve the sealing.

WALTER O. VEDDER.

REFERENCES CITED

The following references are of record in the file of this patent:

UNITED STATES PATENTS

| Number | Name | Date |
|---|---|---|
| 735,904 | Picher et al. | Aug. 11, 1903 |
| 1,143,833 | Keller | June 22, 1915 |
| 1,496,666 | Fatscher | June 3, 1924 |
| 1,703,681 | Miller | Feb. 26, 1929 |
| 2,079,315 | Dickerson | May 4, 1937 |
| 2,143,664 | Snyder | Jan. 10, 1939 |

FOREIGN PATENTS

| Number | Country | Date |
|---|---|---|
| 10,077 | Great Britain | Apr. 26, 1911 |